(12) United States Patent
Oota et al.

(10) Patent No.: US 10,131,971 B2
(45) Date of Patent: Nov. 20, 2018

(54) HIGH STRENGTH ALUMINUM ALLOY SHEET FOR ANODIC OXIDE COATED MATERIAL AND METHOD OF PRODUCING SAME AND HIGH STRENGTH ANODIC OXIDE ALUMINUM ALLOY SHEET

(71) Applicant: NIPPON LIGHT METAL COMPANY, LTD., Tokyo (JP)

(72) Inventors: Atsushi Oota, Aichi (JP); Fumio Otake, Aichi (JP); Takeshi Handa, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 278 days.

(21) Appl. No.: 14/912,342

(22) PCT Filed: Aug. 13, 2013

(86) PCT No.: PCT/JP2013/071892
§ 371 (c)(1),
(2) Date: Feb. 16, 2016

(87) PCT Pub. No.: WO2015/022734
PCT Pub. Date: Feb. 19, 2015

(65) Prior Publication Data
US 2016/0201178 A1    Jul. 14, 2016

(51) Int. Cl.
| | |
|---|---|
| *C22F 1/047* | (2006.01) |
| *C22C 21/08* | (2006.01) |
| *B32B 15/00* | (2006.01) |
| *C22C 21/00* | (2006.01) |
| *C22F 1/04* | (2006.01) |
| *C23C 18/12* | (2006.01) |
| *C23C 22/66* | (2006.01) |
| *B32B 15/04* | (2006.01) |
| *C25D 11/04* | (2006.01) |
| *C25D 11/06* | (2006.01) |
| *C25D 11/08* | (2006.01) |
| *C25D 11/14* | (2006.01) |
| *C25D 11/16* | (2006.01) |
| *C22C 21/06* | (2006.01) |
| *C22F 1/00* | (2006.01) |
| *C25D 11/24* | (2006.01) |

(52) U.S. Cl.
CPC ............. *C22C 21/00* (2013.01); *B32B 15/04* (2013.01); *C22C 21/06* (2013.01); *C22C 21/08* (2013.01); *C22F 1/04* (2013.01); *C22F 1/047* (2013.01); *C23C 18/12* (2013.01); *C23C 18/1216* (2013.01); *C23C 22/66* (2013.01); *C25D 11/04* (2013.01); *C25D 11/06* (2013.01); *C25D 11/08* (2013.01); *C25D 11/14* (2013.01); *C25D 11/16* (2013.01); *C22F 1/00* (2013.01); *C25D 11/246* (2013.01); *Y10T 428/1259* (2015.01); *Y10T 428/1266* (2015.01); *Y10T 428/12597* (2015.01); *Y10T 428/12604* (2015.01); *Y10T 428/12611* (2015.01); *Y10T 428/12618* (2015.01); *Y10T 428/12667* (2015.01); *Y10T 428/12736* (2015.01); *Y10T 428/12764* (2015.01); *Y10T 428/12993* (2015.01)

(58) Field of Classification Search
CPC ..... C23C 18/12; C23C 18/1216; C23C 22/66; C23C 22/82; B32B 15/04; Y10T 428/12736; Y10T 428/12993; Y10T 428/12764; Y10T 428/1259; Y10T 428/12597; Y10T 428/12604; Y10T 428/12611; Y10T 428/12618; Y10T 428/1266; Y10T 428/12667; C22F 1/04
See application file for complete search history.

(56) References Cited

U.S. PATENT DOCUMENTS

| | | | | |
|---|---|---|---|---|
| 5,904,989 | A * | 5/1999 | Hanggi ............. | C25D 11/04 428/457 |
| 6,215,806 | B1 * | 4/2001 | Ohmi ............... | H01S 3/0305 372/34 |
| 2006/0260947 | A1 * | 11/2006 | Kia ................... | C25D 5/50 205/173 |

FOREIGN PATENT DOCUMENTS

| | | |
|---|---|---|
| CN | 101469386 A | 7/2009 |
| JP | 58-11769 A | 1/1983 |
| JP | 62-275546 A | 11/1987 |
| JP | 63-143234 A | 6/1988 |
| JP | 63-250493 A | 10/1988 |
| JP | 2006111955 A * | 4/2006 |

OTHER PUBLICATIONS

JP 63143234_MT Jun. 15, 1988.*
WO 2009/034126_MT Mar. 19, 2009.*
English Abstract of CN 101469386 A published Jul. 1, 2009 (1 page).
International Search report dated Oct. 22, 2013 corresponding to PCT/JP2013/071892 application (p. 1).
English Abstract of JP 62-275546 A published Nov. 30, 1987.

* cited by examiner

*Primary Examiner* — Michael E. La Villa
(74) *Attorney, Agent, or Firm* — Millen, White, Zelano & Branigan, P.C.; William Nixon

(57) ABSTRACT

An aluminum alloy sheet which is high in strength and excellent in heat conductivity, and which can be given an anodic oxide coating with a white color and a suitable yellowishness is provided. An aluminum alloy ingot containing Mg: 0.80 to 1.8 mass %, Fe: 0.05 to 0.30 mass %, Si: 0.20 mass % or less, Cu: 0.03 to 0.15 mass %, Mn: 0.05 to 0.20 mass %, and Cr: 0.05 to 0.15 mass %, restricts Zn to less than 0.15 mass %, and balance of Al and unavoidable impurities is treated by holding it at 560 to 620° C. for 1 to 5 hours, then hot rolled and, either through or not through process annealing, and cold rolled by a final cold rolling reduction of 15 to 95% to obtain an aluminum alloy sheet which has a 0.2% yield strength of 180 MPa or more and a conductivity of 40 (IACS %) or more.

13 Claims, No Drawings

HIGH STRENGTH ALUMINUM ALLOY SHEET FOR ANODIC OXIDE COATED MATERIAL AND METHOD OF PRODUCING SAME AND HIGH STRENGTH ANODIC OXIDE ALUMINUM ALLOY SHEET

TECHNICAL FIELD

The present invention relates to an aluminum alloy sheet used as a housing of electronic equipment etc., having a high strength, excellent in heat conductivity, and able to be given a uniform anodic oxide coating with a white-based suitably yellowish color.

BACKGROUND ART

An Al—Fe-based 8000-series alloy has a high strength and a relatively good anodic oxide coatability, so has been used as the material for producing a decorative sheet for building material or a housing of electronic equipment etc. This is formed into a sheet material, which is then cut into the desired dimensions and shaped according to need, then treated at its outer surface to form an anodic oxide coating and used as a building material. Further, after forming the anodic oxide coating, the sheet is given gloss by buff-polishing and also used as the housing of electronic equipment etc.

An aluminum alloy sheet which is based on both the 8000-series alloy and 5000-series alloy to secure strength while is prescribed in the amounts of Si, Fe, Mn, etc. to make the anodic oxide coating color a light gray or an aluminum alloy sheet which is based on 8000-series alloy to secure strength while further having added Mn, Si to make the anodic oxide coating color uniform and a method of production of the same etc. have also been developed. Further, recently, an aluminum alloy sheet based on the 1000-series alloy and improved in uniformity of color of the anodic oxide coating and its method of production etc. have also been developed.

For example, PLT 1 describes an aluminum alloy sheet which is comprised of an aluminum alloy which contains Fe: 0.1 to 1.0 wt %, Si: 0.01 to 0.5 wt %, and Mn: 0.05 to 1.0 wt % and has a balance of Al and unavoidable impurities and which is treated by anodic oxidation to form a uniform color and describes to subject an aluminum alloy ingot of the above composition to a homogenization at 400 to 600° C., hot roll this aluminum alloy ingot to obtain a hot rolled sheet, then cold roll this hot rolled sheet, including process annealing and/or final annealing, and treat it by anodic oxidation to obtain an aluminum alloy sheet which forms a uniform color.

On the other hand, in an aluminum alloy sheet which is based on a 8000-series alloy, while depending also on the homogenization treatment conditions, it is known that the anodic oxide coating easily becomes uneven in color and that a uniform white-based anodic oxide coating color is not easy to obtain. Therefore, an aluminum alloy sheet which is based on the 1000-series and is improved in uniformity of the roughened surface and uniformity of the color of the anodic oxide coating and a method of production of the same have been developed.

PLT 2 describes an aluminum alloy sheet which contains Fe: 0.2 to 0.6 wt %, Si: 0.03 to 0.20 wt %, and Ti: 0.005 to 0.05 wt % and has a balance of Al and unavoidable impurities and a method of production of the same. According to this, by suitably adjusting the contents of the chemical components Fe, Si, and Ti of the materials and in particular making the Fe/Si ratio a suitable range, the formation of metastable phases is suppressed, the intermetallic compounds become mainly stable phases, and the uniformity of pits formed by roughening treatment and the uniformity of color of the anodic oxide coating are remarkably improved.

An alloy sheet based on the 1000-series is excellent in uniformity of etch pits formed during alkali etching by caustic soda and in uniformity of color of the anodic oxide coating and is excellent in shapeability, but has the problem of a low strength. Therefore, while a white-based anodic oxide coating color is being sought, high strength characteristics are also expected to be demanded, so application of an aluminum material based on the 1000-series would be a problem.

Therefore, an Al—Mg-based 5000-series alloy sheet for anodic oxide coating excellent in high strength characteristics has been developed.

PLT 3 proposes an aluminum alloy sheet which contains, by mass %, Mg: 2.0 to 3.0%, Cr: 0.15 to 0.25%, Ti: 0.005 to 0.20%, or Ti: 0.005 to 0.20% and B: 0.0005 to 0.05%, has a balance of Al and unavoidable impurities, restricts as impurities the Si to 0.15% or less, Fe to 0.4% or less, and Mn to 0.06% or less, and, when making the content of the Cr $T_{CR}$ % and the solid solution amount of Cr $S_{CR}$ %, $P_{CR}=T_{CR}-S_{CR}\leq 0.065\%$.

According to this, by restricting the Cr-containing intermetallic compounds Cr to a predetermined level or less, it is said that an Al—Mg-based alloy sheet which contains Cr enables the production of an aluminum alloy sheet which forms a light green white color kept down in yellowishness even if forming an anodic oxide coating by a sulfuric acid bath.

CITATIONS LIST

Patent Literature

PLT 1: Japanese Patent Publication No. 08-253831A
PLT 2: Japanese Patent Publication No. 2000-282159A
PLT 3: Japanese Patent Publication No. 2011-179094A

SUMMARY OF INVENTION

Technical Problem

In this regard, for housings of electronic equipment etc., anodic oxide coatings forming a uniform white-based color have been preferably used. In recent years, electronic equipment has been made thinner and smaller, in which materials which are not only high in strength, but also excellent in heat radiating ability are desired. In high strength 5000-series alloy sheet, to raise the heat radiating ability, it is effective to lower the content of the Mg, which easily forms a solid solution in the matrix, and to thereby raise the conductivity. However, when such a 5000-series alloy sheet reduced in Mg content is used as a material for a housing, sometimes it is used in combination with an A5052 alloy sheet (for example, processed condition: $H_{32}$). In this case, only naturally, uniformity of color of the housing has been demanded. A color based on that of an anodic oxide coating given to an A5052 alloy sheet is being sought from an anodic oxide coating given to a low Mg 5000-series alloy sheet.

However, an A5052 alloy, according to the AA standard, has an Mg content of 2.2 to 2.8 mass % and a Cr content of 0.15 to 0.35 mass %, in which the Mg content is relatively high, so the strength is high and the lightness (L* value) of the anodic oxide coating tends to become somewhat high, but on the other hand, is inferior in heat conductivity while inclusion of Cr makes the anodic oxide coating color tend to become tinged lightly yellow. Therefore, even if applying the art shown in PLT 3 to a low Mg content 5000-series alloy sheet with an Mg content lower than that of an A5052 alloy and with a good heat conductivity, it was extremely difficult to obtain an anodic oxide coating of a uniform white-based suitably yellowish color.

The present invention was devised to solve this problem and has as its object the provision of an aluminum alloy sheet which is used for a housing of electronic equipment etc., can be given a uniform anodic oxide coating with a white-based suitably yellowish color, and is high in strength and excellent in heat conductivity.

Solution to Problem

The high strength aluminum alloy sheet for anodic oxide coating of the present invention, to achieve this object, is characterized in that it contains Mg: 0.80 to 1.8 mass %, Fe: 0.05 to 0.30 mass %, Si: 0.20 mass % or less, Cu: 0.03 to 0.15 mass %, Mn: 0.05 to 0.20 mass %, and Cr: 0.05 to 0.15 mass %, restricts Zn to less than 0.15 mass %, and has a balance of Al and unavoidable impurities and which has a 0.2% yield strength of 180 MPa or more and an electrical conductivity of 40 (IACS %) or more.

As the high strength aluminum alloy sheet for anodic oxide coating of the present invention, one where the integrated diffraction intensity ratio (I$\alpha$-Al(Fe.Mn)Si/IAl$_3$Fe) obtained when performing X-ray diffraction analysis is within the range of 0.1 to 0.8 is preferable.

Further, such a high strength aluminum alloy sheet for anodic oxide coating is produced by subjecting an aluminum alloy ingot having the above chemical composition to homogenization at a temperature of 560 to 620° C. for holding time of 1 to 5 hours, then hot rolling, and cold rolling at a final cold rolling reduction of 15 to 95% with or without process annealing.

Further, if pretreating an aluminum alloy sheet for anodic oxide coating which is provided in the present invention by alkali etching and further treating it by anodic oxide coating treatment in sulfuric acid, an anodic oxide coating which exhibits a color of an L* value of the CIE standard of 85 to 90, an a* value of −1.0 to −0.3, and a b* value of 0.5 to 1.0 in range is obtained.

Advantageous Effects of Invention

The aluminum alloy sheet having a high strength and good heat conductivity provided by the present invention develops a uniform anodic oxide coating of a white-based suitably yellowish color when anodized, so it is possible to provide a material for anodic oxidation suitable for a housing of electronic equipment etc. at a low cost.

DESCRIPTION OF EMBODIMENTS

As explained above, in housings of electronic equipment etc., an anodic oxide coating of a white-based uniform color has preferably been used. Further, when used for housings of electronic equipment etc., since sometimes relatively thin aluminum alloy sheet is stamped into a predetermined shape by using a die, strength after shaping is also frequently required. Therefore, as the material used, usually one which has a high strength is demanded.

In this regard, to obtain an anodic oxide coating with a white-based uniform color at an Al—Mg—Fe-based aluminum alloy sheet, it becomes necessary to make the Al$_6$Fe metastable phase formed in the ingot diffusion-transform to Al$_3$Fe stable phase by homogenization treatment. In general, when the homogenization treatment temperature of an ingot is high, the Al$_6$Fe metastable phase formed in the ingot are made to diffusion-transform to Al$_3$Fe stable phase by a relatively high temperature homogenization treatment whereby an anodic oxide coating of a white-based color tends to be formed.

If Al$_6$Fe metastable phases formed in the ingot remain in the material for anodic oxide coating treatment, the particles of the Al$_6$Fe metastable phase are taken into the anodic oxide coating without being oxidized, so the coating becomes thicker and the anodic oxide coating forms a gray color. On the other hand, when the Al$_3$Fe stable phase formed in the ingot remain in the material for anodic oxide coating treatment, they are taken into the anodic oxide coating while oxidized, so even if the coating becomes thicker, there is little drop in lightness and the anodic oxide coating does not easily form a gray color.

Further, when, like in the present invention, including a predetermined amount of Mn for giving a suitable yellowish color to the anodic oxide coating, $\alpha$-Al(Fe.Mn)Si phase is formed in the ingot. Details will be explained later, but it was learned that particles of the $\alpha$-Al(Fe.Mn)Si phase formed in the ingot remain in the final sheet, though partially forming solid solutions in the matrix due to the homogenization treatment, and are taken into the anodic oxide coating, whereby it is learned that the coating becomes thicker and the anodic oxide coating easily forms a gray color.

Of course, the state of precipitation of the precipitates will change and the dislocation density will also change even with the thermal refining of the final sheet, including the process annealing conditions in the cold rolling process. For this reason, the state of etch pits in alkali etching treatment will change and as a result the color and uniformity of color after anodic oxide coating treatment will also be affected. Therefore, it may be considered that the rolling reduction at the cold rolling after process annealing will become an issue.

Therefore, the inventors investigated in detail the effects of the homogenization treatment temperature, cold rolling (thermal refining), and other manufacturing conditions etc. on the color of an anodic oxide coating. Further, the inventors engaged in intensive studies through tensile tests, measurement of electrical conductivity, X-ray diffraction intensity analysis of intermetallic compounds in the material for anodic oxide coating treatment, etc., so as to obtain aluminum alloy sheet which is high in strength and excellent in heat conductivity which can be given a uniform anodic oxide coating with a white-based suitably yellowish color and thereby reached the present invention.

Below, the details will be explained.

First, the actions, suitable contents, etc. of the elements which are contained in the aluminum alloy sheet of the present invention will be explained.

Mg: 0.80 to 1.8 Mass %

Mg is an essential element for securing the strength of an aluminum alloy sheet. If the Mg content is less than 0.80 mass %, the strength of the aluminum alloy sheet falls, so this is not preferred. If the content of Mg exceeds 1.8 mass %, not only does the final sheet fall in electrical conductivity (heat conductivity), but also, while due also to the homogenization treatment temperature, the Mg segregated layer ($\beta$-Mg phases) present at the ingot is liable to cause burning (local melting).

Therefore, Mg content is prescribed as 0.80 to 1.8 mass %. The more preferable Mg content is 0.85 to 1.7 mass % in range. The still more preferable Mg content is 0.90 to 1.6 mass % in range.

Fe: 0.05 to 0.30 Mass %

Fe is an essential element for securing the strength of an aluminum alloy sheet. If the Fe content is less than 0.05 mass %, the strength of the aluminum alloy sheet falls, so this is not preferred. If the content of Fe exceeds 0.30 mass %, not only does the shapeability fall, but also, while due also to the homogenization treatment temperature, the α-Al(Fe.Mn)Si phase remaining in the final sheet become greater, particles of the α-Al(Fe.Mn)Si phase are taken into the anodic oxide coating, a gray color is easily formed, and the lightness (L* value) falls, so this is not preferable.

Therefore, the Fe content is prescribed as 0.05 to 0.30 mass %. The more preferable Fe content is 0.07 to 0.28 mass % in range. The still more preferable Fe content is 0.10 to 0.25 mass % in range.

Si: 0.20 Mass % or Less

Si enters from the metal raw materials and recycled materials. Si forms intermetallic compounds with Mg, but if over 0.20% in range, causes the solidus temperature to fall and makes homogenization treatment with a holding temperature of 560° C. or more impossible. In the present invention, homogenization treatment with a holding temperature of 560° C. or more is necessary, so the Si content is prescribed as 0.20 mass % or less in range. The more preferable Si content is 0.18 mass % or less in range. The still more preferable Si content is 0.15 mass % or less in range.

Cu: 0.03 to 0.15 Mass %

Cu enters from the metal raw materials and recycled materials. Cu is an essential element in giving a suitable yellowishness (b* value in CIE standard) to the anodic oxide coating color. If the Cu content is less than 0.03 mass %, the yellowishness (b* value) of the anodic oxide coating color becomes too weak and the necessary gloss is not obtained at the housing etc. Further, if the Cu content exceeds 0.15 mass %, while depending also on the amount of precipitation of the $CuAl_2$, $CuMgAl_2$, etc. in the final sheet, the yellowishness (b* value) of the anodic oxide coating color becomes too strong.

Therefore, the Cu content is prescribed as 0.03 to 0.15 mass %. The more preferable Cu content is 0.03 to 0.12 mass % in range. The still more preferable Cu content is 0.03 to 0.10 mass % in range.

Mn: 0.05 to 0.20 Mass %

Mn enters from the metal raw materials and recycled materials. Mn is an essential element in giving a suitable yellowishness (b* value) to the anodic oxide coating color. If the Mn content is less than 0.05 mass %, a suitable yellowishness (b* value) cannot be obtained. If the Mn content is over 0.20 mass %, the yellowishness (b* value) not only becomes too strong, but also, while depending on the homogenization treatment temperature, the amount of the α-Al(Fe.Mn)Si phase which remains in the final sheet becomes greater, particles of the α-Al(Fe.Mn)Si phase are taken into the anodic oxide coating, a gray color is easily formed, and the lightness (L* value of CIE standard) falls, so this is not preferable.

Therefore, the Mn content is prescribed as 0.05 to 0.20 mass % in range. The more preferable Mn content is 0.05 to 0.18 mass % in range. The still more preferable Mn content is 0.05 to 0.15 mass % in range.

Cr: 0.05 to 0.15 Mass %

Cr enters from the metal raw materials and recycled materials. Cr is an essential element giving a suitable yellowishness (b* value) to the anodic oxide coating color. If the Cr content is less than 0.05 mass %, a suitable yellowishness (b* value) cannot be obtained. If the Cr content is over 0.15 mass %, the yellowishness (b* value) of the anodic oxide coating color becomes too strong, so this is not preferred.

Therefore, the Cr content is prescribed as 0.05 to 0.15 mass %. The more preferable Cr content is 0.05 to 0.12 mass % in range. The still more preferable Cr content is 0.05 to 0.10 mass % in range.

Zn: Less than 0.15 Mass %

Zn unavoidably enters from recycled materials etc. Zn content is prescribed as a component which strengthens the yellowishness (b* value) of the anodic oxide coating color. In the present invention, the Zn content is prescribed as less than 0.15 mass %. If the Zn content is 0.15 mass % or more, in the alkali etching by caustic soda as the pretreatment for anodic oxide coating, the amount of dissolution of Zn into the treatment solution increases and an alkali bath containing zinc oxide is formed. If pretreatment in an alkali bath is continued, Zn precipitates on the surface of the aluminum alloy sheet and the appearance after treatment to form the anodic oxide coating is liable to become uneven and the beauty is liable to be impaired.

Therefore, the Zn content is prescribed as less than 0.15 mass %. The more preferable Zn content is less than 0.12 mass %. The still more preferable Zn content is less than 0.10 mass %.

Ti: 0.001 to 0.10 Mass %

Ti enters from the metal raw materials and recycled materials. Ti acts as a crystal grain refining agent at the time of casting of the ingot and prevents casting cracks. Of course, Ti may be added alone, but by providing it together with B, a further stronger crystal grain refining effect can be expected so Al-5% Ti-1% B or another rod hardener may also be added. If the Ti content is less than 0.001 mass %, the refining effect at the time of production of an ingot will be insufficient, so casting cracks are liable to be invited. If the Ti content exceeds 0.10 mass %, $TiAl_3$ and other coarse intermetallic compounds will precipitate at the time of casting the ingot and there is a possibility of streak-like defects forming, so this is not preferable.

Therefore, the preferable Ti content is 0.001 to 0.10 mass % in range. The more preferable Ti content is 0.005 to 0.07 mass % in range. The still more preferable Ti content is 0.01 to 0.05 mass % in range.

Other Unavoidable Impurities

Unavoidable impurities enter unavoidably from the metal raw materials, recycled materials, etc., so the allowable contents of these are for example Ni: less than 0.10 mass %, Zr: less than 0.10 mass %, Ga, B, and V: less than 0.05 mass %, Pb, Bi, Sn, Na, Ca, Sr: respectively less than 0.02 mass %, and others: respectively less than 0.05 mass %. Even if including these unmanaged elements in these ranges, the effect of the present invention is not impaired.

In particular, regarding B, like Ti, it acts as a crystal grain refining agent at the time of casting the ingot and can prevent casting cracks. Therefore, this can be included in accordance with need. If the B content is over 0.05 mass %, the $TiB_2$ becomes a stabilized intermetallic compound and is liable to reduce the effect of refining the crystal grains and reduce the uniformity of the anodic oxide coating color, so this is not preferable.

Further, the required characteristics of the aluminum alloy sheet of the present invention will be explained.

0.2% Yield Strength: 180 MPa or More

The alloy sheet comprised of the aluminum alloy material of the present invention which is treated to form a white color anodic oxide coating is used as housings of electronic equipment etc., so a high strength is demanded. In particular, recently, electronic equipment has been made thinner and smaller in size, so an anodic oxide coating treatment material which does not easily deform and can give a high class feeling when used as even thinner material than the past has been desired.

Therefore, the alloy sheet according to the present invention is limited to one with a 0.2% yield strength in a tensile test of 180 MPa or more.

Electrical Conductivity: 40 (IACS %) or More

As explained above, in recent years, electronic equipment has been made thinner and smaller in size. A material excellent in heat radiating ability has also been desired. Therefore, the alloy sheet according to the present invention was limited to one with an electrical conductivity of 40 (IACS %) or more. If an alloy sheet with an electrical conductivity of 40 (IACS %) or more, it can be used as a material with a high heat conductivity and excellent heat radiating ability for applications such as housings of electronic equipment etc.

Anodic Oxide Coating Color: L* Value: 85 to 90, a* Value: −1.0 to −0.3, b* Value: 0.5 to 1.0

While details will be explained later, the final sheet is treated by alkali etching and sulfuric acid to form an anodic oxide coating. The color was measured at the time of a thickness of the anodic oxide coating of 7 μm. If the L* value of the CIE standard is 85 to 90 in range, the a* value of the same is −1.0 to −0.3 in range, and the b* value of the same is 0.5 to 1.0 in range, it can be said that an anodic oxide coating with a white color and a suitable yellowishness was formed at the material for anodic oxide coating treatment use. That is, even if the anodic oxide coating color of the A5052 alloy sheet fluctuates somewhat due to fluctuations in composition within the prescribed ranges or thermal refining or the thickness of the anodic oxide coating or other factors, the material for anodic oxide coating treatment use of the present invention can form a color based on the anodic oxide coating color of A5052 alloy sheet.

Integrated Diffraction Intensity Ratio (Iα-Al(Fe.Mn)Si/ IAl$_3$Fe): 0.1 to 0.8

As explained above, it is known that the lightness (L* value) of the anodic oxide coating color has a relationship with the type of the Fe-based intermetallic compound which is present in the material for anodic oxide coating treatment use. When Al$_6$Fe metastable phase which is formed in the ingot remain in the material for anodic oxide coating treatment use, the particles of the Al$_6$Fe metastable phase are taken into the anodic oxide coating without being oxidized, so the coating becomes thicker and the anodic oxide coating forms a gray color. On the other hand, in the case of Al$_3$Fe stable phase, they are oxidized and taken into the anodic oxide coating, so even if the coating is thick, there is little drop in lightness and the anodic oxide coating does not easily form a gray color.

Further, like in the present invention, when containing a predetermined amount of Mn for giving a suitable yellowishness to the anodic oxide coating color, α-Al(Fe.Mn)Si phase is formed at the ingot. The particles of the α-Al (Fe.Mn)Si phase which are formed in the ingot partially dissolve into solid solution in the matrix by the homogenization treatment, but remain in the final sheet and are taken into the anodic oxide coating whereby the coating becomes thicker and the anodic oxide coating easily forms a gray color.

Of course, the amounts of the Al$_3$Fe stable phase and α-Al(Fe.Mn)Si phase in the final sheet change depending on the Fe, Mn, and Si contents in the aluminum alloy composition, the homogenization treatment temperature, and other manufacturing conditions. Further, the Fe and Mn contents have effects on the color of the anodic oxide coating as explained above.

Therefore, as the factor having an effect on the color of the anodic oxide coating, the integrated diffraction intensity ratio (Iα-Al(Fe.Mn)Si/IAl$_3$Fe) when analyzing the material for anodic oxide coating treatment use by X-ray diffraction analysis was defined. In the range of alloy composition of the present invention, when analyzing the material for anodic oxide coating treatment use by X-ray diffraction analysis, if the integrated diffraction intensity ratio (Iα-Al (Fe.Mn)Si/IAl$_3$Fe) is 0.1 to 0.8 in range, the anodic oxide coating color is in the prescribed range.

Next, the method of manufacture of the high strength aluminum alloy sheet of the present invention will be explained below.

Melting and Refining

The materials are inserted into the melting furnace. After reaching a predetermined melting temperature, flux is suitably inserted and the mixture stirred. Further, in accordance with need, a lance etc. is used to degas the furnace, then the melt was held while being allowed to settle and the slag was removed from the surface of the melt.

In this melting and refining, to obtain predetermined alloy components, it is also important to again charge the base alloy and other materials, but it is extremely important to allow a sufficient settling time until the flux and slag float up to the melt surface from inside the aluminum alloy melt and separate. The settling time is preferably usually 30 minutes or more.

The aluminum alloy melt which is refined in the melting furnace in some cases can be transferred to a holding furnace and then cast, but may also be directly tapped and cast from the melting furnace. The more preferable settling time is 45 minutes or more. If necessary, in-line degassing and filtration may be performed.

The in-line degassing is usually of a type performed by blowing inert gas etc. into the aluminum melt from a rotating rotor and causing the hydrogen gas in the melt to diffuse into the bubbles of the inert gas to be removed. When using nitrogen gas as the inert gas, it is important to maintain the dew point at for example −60° C. or less. The amount of hydrogen gas of the ingot is preferably decreased to 0.20 cc/100 g or less.

Homogenization Treatment Temperature: 560 to 620° C.

In the ingot as cast, there is α-Al(Fe.Mn)Si phase. While depending on the homogenization treatment temperature as well, part of the α-Al(Fe.Mn)Si phase can be made to dissolve into solid solution in the matrix by homogenization treatment. Further, while depending also on the Mn content, in the ingot as cast, Al$_6$Fe and Al$_m$Fe metastable phases may also be formed. In such cases as well, by setting the homogenization treatment temperature high, it is possible to make these Al$_6$Fe and Al$_m$Fe metastable phases diffusion-transform to Al$_3$Fe stable phase.

If the homogenization treatment temperature is less than 560° C., the holding time which is required for dissolution of the α-Al(Fe.Mn)Si phase into solid solution and the above diffusion transformation becomes longer and the productivity falls, so this is not preferred. If the homogenization treatment temperature exceeds 620° C., as explained above, while depending on the amount of Mg, burning (local melting) is liable to occur at the micro Mg segregated layer (β-Mg phases) which was formed at the time of solidification of the ingot.

Therefore, the homogenization treatment temperature was made 560 to 620° C. in range.

Holding Time at Homogenization Treatment Temperature: 1 to 5 Hours

If the holding time at the homogenization treatment temperature is less than 1 hour, while depending also on the rate of temperature rise in the treatment furnace etc. as well, the actual temperature of the ingot as a whole is liable not to reach the predetermined homogenization temperature. If the holding time at the homogenization treatment temperature is over 5 hours, while depending on the homogenization treatment temperature as well, no further effect can be expected, the formation of scale due to oxidation becomes severe, and the productivity also falls, so this is not preferable. Therefore, the holding time at the homogenization treatment temperature is made 1 to 5 hours.

Hot Rolling

An ingot treated for homogenization treatment was then hoisted by a crane and carried from the homogenization treatment furnace to the hot rolling machine. While depending on the type of the hot rolling machine as well, the ingot is usually hot rolled by several rolling passes to a predetermined thickness and taken up in a roll as a hot rolled sheet for example 3 to 8 mm or so thick.

Cold Rolling

The roll of the taken up hot rolled sheet is passed through a cold rolling machine and cold rolled usually by several passes. At this time, work hardening occurs due to the plastic strain which is introduced by the cold rolling, so process annealing treatment is performed in accordance with need. Usual process annealing is also softening treatment, so while depending on also the material, the cold rolled roll is inserted into a batch furnace and held there at 300 to 400° C. in temperature for 1 hour or more. If the holding temperature is lower than 300° C., softening is not promoted, while if the holding temperature is over 400° C., the productivity falls and the treatment cost becomes higher. Further, when performing this process annealing by a continuous annealing furnace (CAL), the material is held at 420 to 480° C. in temperature for within 15 seconds. If the holding temperature is lower than 420° C., softening is not promoted, while if the holding temperature exceeds 480° C., the productivity falls and the treatment cost becomes higher.

Final Cold Rolling Reduction: 15 to 95%

As explained above, the state of precipitation of the precipitates and the dislocation density will also change even with thermal refining of the final sheet including the processing annealing conditions at the time of cold rolling. Therefore, the state of etch pits in alkali etching treatment will change, and the color and uniformity of color after treatment to form the anodic oxide coating will also be affected.

If the final cold rolling reduction is less than 15%, the final sheet will be low in dislocation density, so the etch pit density will also become low, the lightness (L* value) of the material treated to form the anodic oxide coating will be made to drop, and the effect of eliminating streaking will fall. If the final cold rolling reduction is 15% or more, the final sheet will also become high in dislocation density, the etch pit density will also rise, and the lightness (L* value) of the material treated to form the anodic oxide coating will be made to increase resulting in the effect of eliminating streaking. If the final cold rolling reduction exceeds 95%, edge cracking of the coil is liable to occur and the yield is liable to fall, so this is not preferable. Therefore, the final cold rolling reduction is preferably 15 to 95%. The more preferable final cold rolling reduction is 20 to 95% in range. The still more preferable final cold rolling reduction is 30 to 95% in range.

Final Annealing

In the present invention, the final annealing which is performed after the final cold rolling may for example be batch treatment using an annealing furnace to hold the material at a temperature of 150 to 200° C. for 1 hour or more, but may also be continuous annealing treatment using a continuous annealing furnace to hold the material at for example 200° C. to 250° C. temperature for within 15 seconds. Whatever the case, in the present invention, the final annealing is not necessarily essential, but if considering the case of shaping the material before treatment to form an anodic oxide coating by a die stamping, the final sheet is preferably made somewhat soft. If considering the shapeability by die stamping, the material is preferably treated to anneal it at a relatively low temperature. Further, this relatively low temperature annealing treatment also has meaning as softening treatment, but also has meaning as stabilizing treatment. In an as-rolled material not treated to anneal it, along with the elapse of a long period of time, a drop in the yield strength is observed, so this has the aim of performing aging treatment in advance and stabilizing the yield strength over a long term.

EXAMPLES

Preparation of Final Sheet

Predetermined ingots and scrap materials were weighed and mixed then inserted into the melting furnace/holding furnace. This mixture was melted at 800° C., then two 1-kg packs of deslagging flux were inserted, then a stirring rod was used to sufficiently stir the aluminum melt in the furnace. Next, Mg ingots were inserted and the melt allowed to settle for 30 minutes, then a spoon was used to obtain a disk sample in a casting mold for analysis of the components. Next, the slag which floated up to the melt surface was removed by the stirring rod. Based on the results of intermediate analysis of the previously obtained disk sample, the insufficient components were made up for by charging various ingots and the melt was further stirred. After this, the melt was allowed to settle for a further 30 minutes, then a spoon was used to obtain a disk sample in a casting mold for analysis of the components.

After the confirming the analysis values of the components, the melt was discharged from the tap hole to the trough. When the melt surface reached a predetermined position of the trough, the melt began to be injected from dip tubes to the insides of the casting molds. When the melt surfaces reached predetermined positions of the casting molds in all of the casting molds, the lower molds began to be lowered. The speed of descent of the lower molds was in the steady state 50 mm/min. In this way, width 1350 mm×thickness 560 mm×length 3500 mm ingots were cast. The disk samples were analyzed for composition by emission spectrochemical analysis. The results of the analysis of the final melt components are shown in Table 1.

Each ingot was cut to remove the front end and rear end, then a milling machine was used to grind the two surfaces of the ingot. This ingot was inserted into a soaking furnace where it was heated at a 30° C./hr temperature elevation rate to a predetermined temperature (530° C., 580° C.) and held at a predetermined temperature for 1 hour for homogenization treatment. After that, the ingot was hoisted by a crane and moved from the soaking furnace to the table of a hot rolling machine, was hot rolled by the hot rolling machine to a predetermined thickness, then the hot rolled sheet was taken up in a roll.

TABLE 1

Chemical Composition of Test Materials

| Alloy no. | Cu | Si | Fe | Mn | Mg | Zn | Cr | Ti | Al+ unavoidable impurities | Remarks |
|---|---|---|---|---|---|---|---|---|---|---|
| A | 0.05 | 0.07 | 0.20 | 0.07 | 1.4 | <0.05 | 0.08 | <0.05 | Balance | Ex. |
| B | 0.07 | 0.08 | 0.19 | 0.09 | 1.5 | <0.05 | 0.08 | <0.05 | Balance | |
| C | 0.08 | 0.07 | 0.21 | 0.07 | 1.0 | <0.05 | 0.07 | <0.05 | Balance | |
| D | 0.01 | 0.08 | 0.27 | 0.02 | 2.7 | <0.05 | 0.18 | <0.05 | Balance | Comp. ex. |
| E | 0.02 | 0.08 | 0.28 | 0.08 | 1.4 | <0.05 | 0.08 | <0.05 | Balance | |
| F | 0.17 | 0.07 | 0.19 | 0.08 | 1.4 | <0.05 | 0.08 | <0.05 | Balance | |
| G | 0.02 | 0.07 | 0.34 | <0.01 | <0.01 | <0.05 | <0.01 | <0.05 | Balance | |
| H | 0.15 | 0.21 | 0.49 | 1.09 | 1.0 | <0.05 | 0.02 | <0.05 | Balance | |
| I | 0.03 | 0.09 | 0.27 | 0.01 | 1.0 | 0.05 | 0.01 | <0.05 | Balance | |

Note)
Underlined values mean values outside ranges prescribed for elements.

After that, each hot rolled sheet was cold rolled and process annealed at a predetermined thickness or not process annealed to obtain a final thickness 0.8 mm cold rolled sheet. Further, when performing final annealing, the cold rolled sheet was passed through a continuous annealing furnace (CAL) where it was held at a predetermined temperature for within 15 seconds for continuous annealing treatment, then was water cooled or was held at a predetermined temperature for 1 hour for batch annealing treatment, then was air-cooled as a coil. Table 2 shows the manufacturing conditions of the test materials.

TABLE 2

Manufacturing Conditions of Test Materials

| Test material no. | Alloy no. | Homogenization treatment conditions | Process annealing holding temperature | Final cold rolling reduction | Final annealing holding temperature |
|---|---|---|---|---|---|
| Ex. 1 | A | 580° C. × 1 hr | 440° C. (CAL) | 56% | 230° C. (CAL) |
| Ex. 2 | B | 580° C. × 1 hr | 440° C. (CAL) | 56% | 230° C. (CAL) |
| Ex. 3 | C | 580° C. × 1 hr | — | 87% | — |
| Comp. Ex. 1 | D | 530° C. × 1 hr | 440° C. (CAL) | 18% | 230° C. (CAL) |
| Comp. Ex. 2 | E | 530° C. × 1 hr | 440° C. (CAL) | 56% | 230° C. (CAL) |
| Comp. Ex. 3 | E | 580° C. × 1 hr | 440° C. (CAL) | 56% | 230° C. (CAL) |
| Comp. Ex. 4 | F | 580° C. × 1 hr | 440° C. (CAL) | 56% | 230° C. (CAL) |
| Comp. Ex. 5 | G | 580° C. × 1 hr | — | 87% | 220° C. (Batch) |
| Comp. Ex. 6 | H | 530° C. × 1 hr | 330° C. (Batch) | 33% | 150° C. (Batch) |
| Comp. Ex. 7 | I | 580° C. × 1 hr | — | 87% | — |

Note)
"—" means annealing treatment not performed.

Next, the obtained final sheets (test materials) were evaluated for tensile characteristics.

Evaluation of Tensile Characteristics

The obtained final sheets were evaluated for strength by the 0.2% yield strength (MPa) in a tensile test. Specifically, a JIS No. 5 test piece was taken so that the tensile direction became parallel to the rolling direction and was tested by a tensile test based on JIS Z 2241 to find the tensile strength, 0.2% yield strength, and elongation (elongation at break). In this Description, a test material with a 0.2% yield strength of 180 MPa or more was evaluated as good in strength (good), while a test material with a 0.2% yield strength of less than 180 MPa was evaluated as poor in strength (poor). The results of evaluation are shown together in Table 3.

The obtained final sheets were treated by the following alkali etching treatment. In the alkali etching treatment, first, the test material was dipped in a 30 mass % nitric acid solution at room temperature for 5 minutes, then was sufficiently rinsed, then was dipped in a 5 mass % sodium hydroxide solution at 50° C. for 3 minutes, then rinsed and further dipped in a 30 mass % nitric acid solution at room temperature for 3 minutes, then rinsed.

Next, in the treatment to form an anodic oxide coating, the test material was treated to form an anodic oxide coating in a solution of a sulfuric acid concentration of 170 g/liter and dissolved Al of 10 g/liter at a solution temperature of 18° C. and a current density of 1.0 A/dm$^2$. The treatment to form the anodic oxide coating was performed until the coating thickness became 7 μm, then the material was rinsed then treated at 95° C. for 15 minutes to close the pores, then was rinsed and dried at room temperature.

Evaluation of Color

The color of the anodic oxide coating (7 μm thickness) formed in the above way was measured and evaluated. The anodic oxide coating color was measured based on JIS Z 8722 using a chroma meter (CR-300, made by MINOLTA) and using a D65 light source. The measured color values were expressed by the L*a*b* values of the CIE standard. The L* value shows the lightness. The larger the value, the brighter and the closer to a white color. The a* value and the b* value show the color. The a* value shows the red color at the + plus and the green color at the − side, while the b* value shows the yellow color at the + side and the blue color at the − side. The larger the absolute values, the stronger the colors.

In the Description, a test material with an L* value inside 85 to 90 in range was evaluated as good in color evaluation (good), while a test material with an L* value outside 85 to 90 in range was evaluated as poor in color evaluation (poor). A test material with an a* value inside −1.0 to −0.3 in range was evaluated as good in color evaluation (good), while a test material with an a* value outside −1.0 to −0.3 in range was evaluated as poor in color evaluation (poor). A test material with a b* value inside 0.5 to 1.0 in range was evaluated as good in color evaluation (good), while a test material with a b* value outside 0.5 to 1.0 in range was evaluated as poor in color evaluation (poor). The results of evaluation are shown together in Table 3.

Evaluation of Electrical Conductivity

The electrical conductivity (IACS %) was measured by an electrical conductivity meter (AUTOSIGMA 2000, made by Hocking Japan). A test material with an electrical conductivity of 40 (IACS %) or more was evaluated as good in electrical conductivity (good), while a test material with an electrical conductivity of less than 40 (IACS %) was evaluated as poor in electrical conductivity (poor). The results of evaluation are shown together in Table 3.

Overall Evaluation

The overall evaluation was made a good overall evaluation (good) only for a test material where all of the L* value, a* value, and b* value of the results of measurement of the anodic oxide coating color with a thickness of the anodic oxide coating of 7 μm were in the above-mentioned reference ranges, the 0.2% yield strength was 180 MPa or more, and the electrical conductivity was 40 (IACS %) or more and was made a poor overall evaluation (poor) when even one of the above items was not satisfied.

The test materials of Examples 1 to 3 had alloy compositions in the prescribed ranges, had all of the L* value, a* value, and b* value of the anodic oxide coating color in the above-mentioned reference ranges, had a yield strength of 180 MPa or more, had an electrical conductivity of 40 (IACS %) or more, and had good overall evaluations.

The test material of Comparative Example 1 (A5052 alloy composition) had an Mg content of a high 2.7 mass %, so the homogenization treatment temperature was set at a low 530° C. The test material of Comparative Example 1 had an Mn content of a low 0.02 mass %, but the Cr content was a high 0.18 mass %, so the L* value, a* value, and b* value of the anodic oxide coating color were all in the prescribed ranges. However, the Mg content was a high 2.7 mass %, so the electrical conductivity was a too low 35 (IACS %) and outside the prescribed range.

The test material of Comparative Example 2 had a homogenization treatment temperature of a low 530° C., so the L* value of the anodic oxide coating was too low and outside the prescribed range. Further, the Cu content was a low 0.02 mass %, so the b* value of the anodic oxide coating color was too low and outside the prescribed range.

The test material of Comparative Example 3 had a homogenization treatment temperature of a high 580° C., so the L* value of the anodic oxide coating color was inside the prescribed range. However, the Cu content was a low 0.02 mass %, so the b* value of the anodic oxide coating color was too low and outside the prescribed range.

The test material of Comparative Example 4 had a Cu content of a high 0.17 mass %, so the L* value of the anodic oxide coating color was low and the b* value was too high and they were outside the prescribed range.

The test material of Comparative Example 5 had an Fe content of a high 0.34 mass %, but had an Mn content, Cr content, and Mg content of low ones of less than 0.01 mass %, so the L* value, a* value, and b* value of the anodic oxide coating color were all inside the prescribed ranges. However, the Mg content was less than 0.01 mass %, so the yield strength was 110 MPa and too low and outside the prescribed range.

The test material of Comparative Example 6 had an Fe content of a high 0.49 mass % and a Mn content of an extremely high 1.09 mass % and further a homogenization treatment temperature of a low 530° C., so the L* value of the anodic oxide coating color was low and the a* value and b* value were too high and outside the prescribed range.

TABLE 3

| Test material no. | Alloy no. | Anodic oxide coating color (7 μm thick) | | | | | | Yield strength (MPa) | | Conductivity (IACS %) | | Overall judgment |
|---|---|---|---|---|---|---|---|---|---|---|---|---|
| | | L* value | Judgment | a* value | Judgment | b* value | Judgment | | Judgment | | Judgment | |
| Prescribed range | | 85-90 | | 1.0-0.3 | | 0.5-1.0 | | 180 or more | | 40 or more | | |
| Ex. 1 | A | 86.8 | Good | −0.47 | Good | 0.66 | Good | 205 | Good | 42 | Good | Good |
| Ex. 2 | B | 85.7 | Good | −0.49 | Good | 0.82 | Good | 220 | Good | 42 | Good | Good |
| Ex. 3 | C | 86.8 | Good | −0.47 | Good | 0.91 | Good | 230 | Good | 44 | Good | Good |
| Comp. Ex. 1 | D | 86.0 | Good | −0.59 | Good | 0.81 | Good | 205 | Good | 35 | Poor | Poor |
| Comp. Ex. 2 | E | 83.9 | Poor | −0.44 | Good | 0.46 | Poor | 215 | Good | 41 | Good | Poor |
| Comp. Ex. 3 | E | 85.4 | Good | −0.47 | Good | 0.36 | Poor | 210 | Good | 42 | Good | Poor |
| Comp. Ex. 4 | F | 84.6 | Poor | −0.61 | Good | 1.19 | Poor | 230 | Good | 42 | Good | Poor |
| Comp. Ex. 5 | G | 85.7 | Good | −0.67 | Good | 0.60 | Good | 110 | Poor | 61 | Good | Poor |
| Comp. Ex. 6 | H | 83.6 | Poor | −0.25 | Poor | 1.56 | Poor | 225 | Good | 43 | Good | Poor |
| Comp. Ex. 7 | I | 88.0 | Good | −0.52 | Good | 0.07 | Poor | 230 | Good | 51 | Good | Poor |

The test material of Comparative Example 7 had both a Mn content and a Cr content of a low 0.01 mass %, so the b* value of the anodic oxide coating color was too low and outside the prescribed range.

Here, an XRD apparatus was used for semi-quantatative analysis.

The XRD apparatus used was a Rigaku X-ray diffraction device RAD-rR for measurement. The measurement conditions were a tube of Cu—Kα, a tube voltage of 50 kV, a tube current of 200 mA, a scan rate of 1°/min, and a scan range (2θ) of 10° to 70°. Further, the integrated diffraction intensities were found for the single peaks with high intensity and no overlap with peaks derived from other components among the peaks which represent the detected phases, that is, the peaks of α-Al(Fe.Mn)Si near 2θ=41.7°, Al$_3$Fe near 2θ=24.1°, and Al$_m$Fe near 2θ=25.7°. Note that three integrated diffraction intensities were calculated by the average value for three measurements (n=3) for each sample. Table 4 shows the analyzed test material number, homogenization treatment temperature, L* value at the time of anodic oxide coating thickness of 7 μm, and the results of measurement of intensity of XRD diffraction.

ment temperature is set relatively high, the α-Al(Fe.Mn)Si phase which precipitated during the casting tend to partially dissolve into solid solution in the matrix by homogenization treatment. However, if the Mn content becomes high, the amount of the α-Al(Fe.Mn)Si phase which remains in the final sheet also becomes greater, so it is clear that the anodic oxide coating easily forms a gray color and the L* value falls. Incidentally, the test material of Comparative Example 1, despite the homogenization treatment temperature being a low 530° C., mainly had a low Mn content of 0.02 mass %, so the L* value was 86.0. From this as well, it can be understood that by restricting the Mn content and further setting the solution treatment temperature high, it is possible to keep the amount of formation of the α-Al(Fe.Mn)Si phase in the final sheet low and suppress the drop in the L* value.

INDUSTRIAL APPLICABILITY

As explained above, according to the present invention, it is possible to provide aluminum alloy sheet which is used for a housing of electronic equipment etc., can be given a

TABLE 4

Evaluation Results of Test Material

| Test material no. | Alloy no. | Homogenization treatment temperature | Anodic Oxide Coating L* value | Integrated diffraction intensity | | | Integrated diffraction intensity ratio |
|---|---|---|---|---|---|---|---|
| | | | | α•Al(Fe•Mn)Si | Al$_3$Fe | Al$_m$Fe | Iα•Al(Fe•Mn)Si/Al$_3$Fe |
| Ex. 1 | A | 580 | 86.8 | 1.9 | 8.2 | — | 0.23 |
| Ex. 2 | B | 580 | 85.7 | 3.6 | 7.9 | — | 0.46 |
| Ex. 3 | C | 580 | 86.8 | 1.6 | 9.2 | — | 0.17 |
| Comp. Ex. 1 | D | 530 | 86.0 | 1.6 | 8.3 | — | 0.19 |
| Comp. Ex. 2 | E | 530 | 83.9 | 12.1 | 4.3 | 1.1 | 2.81 |
| Comp. Ex. 3 | E | 580 | 85.4 | 7.3 | 8.0 | — | 0.91 |

Note 1)
L* value of anodic oxide coating content is prescribed as value at coating thickness of 7 μm.
Note 2)
"—" shows less than lower limit of detection.

The test materials of Examples 1 to 3 have alloy compositions in the prescribed range, so the L* value of the anodic oxide coating color is 85 or more and the integrated diffraction intensity ratio (Iα-Al(Fe.Mn)Si/IAl$_3$Fe) is 0.1 to 0.8 in range.

From the results of evaluation of all of the six types of test materials, it was confirmed that at least at the final sheets, no Al$_6$Fe metastable phase remained. Further, the test materials of Comparative Examples 2 and 3 are all the same alloy compositions (E alloy). Only the homogenization treatment temperature differs, so it was confirmed that by setting the homogenization treatment temperature high, the α-Al(Fe.Mn)Si phase which was formed in the ingot tended to dissolve into solid solution in the matrix and that the Al$_m$Fe metastable phase which had been believed to be formed in the ingot tended to diffusion-transform to Al$_3$Fe stable phase by homogenization treatment.

As explained above, in the case of Al$_3$Fe stable phase, even if the anodic oxide coating is thick, there is little of a fall in the lightness (L* value) and the anodic oxide coating does not form a gray color. From the results of X-ray diffraction analysis, in the case of α-Al(Fe.Mn)Si phase, if taken into the anodic oxide coating, it was considered that the coating becomes thick and the anodic oxide coating easily forms a gray color. When the homogenization treat-uniform anodic oxide coating with a white color and a suitable yellowishness, is high in strength, and is excellent in heat conductivity.

The invention claimed is:

1. A high strength anodic oxide coated aluminum alloy sheet characterized by having an anodic oxide coating with a color range of
   an L* value of from 85 to 90, an a* value of from −1.0 to −0.3 and a b* value of from 0.5 to 1.0 provided by subjecting a high strength aluminum alloy sheet for anodic oxide coating treatment to pretreatment by alkaline etching, and further to sulfuric anodic oxide coating treatment,
   wherein said sheet contains:
   Mg: 0.80-1.8 mass %, Fe: 0.05-0.30 mass %, Si: 0.20 mass % or less, Cu: 0.03-0.15 mass %, Mn: 0.05-0.20 mass %, and Cr: 0.05-0.15 mass %, with Zn controlled to less than 0.15 mass %, the balance consisting of Al and unavoidable impurities, and having a 0.2% proof strength of 180 MPa or more and an electric conductivity of 40 (IACS %) or more.

2. The high strength anodic oxide coated aluminum alloy sheet according to claim 1, wherein said sheet is characterized by having an integrated diffraction intensity ratio (Iα-Al(Fe—Mn)Si/IAl$_3$Fe) of 0.1-0.8.

3. The high strength anodic oxide coated aluminum alloy sheet according to claim 1 for use as a housing of electronic equipment in combination with an anodic oxide coated JIS A5052 alloy sheet.

4. The high strength anodic oxide coated aluminum alloy sheet according to claim 1, wherein said sheet contains: 0.85 to 1.7 mass % of Mg, 0.07 to 0.28 mass % of Fe, 0.18 mass % or less of Si, 0.03 to 0.12 mass % of Cu, 0.05 to 0.18 mass % of Mn, and 0.05 to 0.12 mass % of Cr, with Zn controlled to less than 0.12 mass %.

5. The high strength anodic oxide coated aluminum alloy sheet according to claim 1, wherein said sheet contains: 0.90 to 1.6 mass % of Mg, 0.10 to 0.25 mass % of Fe, 0.15 mass % or less of Si, 0.03 to 0.10 mass % of Cu, 0.05 to 0.15 mass % of Mn, and 0.03 to 0.10 mass % of Cr, with Zn controlled to less than 0.10 mass %.

6. The high strength anodic oxide coated aluminum alloy sheet according to claim 1, wherein said sheet contains: 0.85 to 1.7 mass % of Mg.

7. The high strength anodic oxide coated aluminum alloy sheet according to claim 1, wherein said sheet contains: 0.90 to 1.6 mass % of Mg.

8. The high strength anodic oxide coated aluminum alloy sheet according to claim 1, wherein said sheet contains: 0.05 to 0.21 mass % of Fe.

9. The high strength anodic oxide coated aluminum alloy sheet according to claim 1, wherein said sheet contains: 0.05 to 0.15 mass % of Cu.

10. The high strength anodic oxide coated aluminum alloy sheet according to claim 1, wherein said sheet contains: 0.07 to 0.20 mass % of Mn.

11. The high strength anodic oxide coated aluminum alloy sheet according to claim 1, wherein said sheet contains: 0.07 to 0.15 mass % of Cr.

12. A process of producing a high strength anodic oxide coated aluminum alloy sheet according to claim 1, said process comprising: providing an aluminum alloy ingot having a chemical composition as set forth in claim 1, homogenizing said ingot by holding at a temperature of 560-620° C. for 1-5 hours, then hot rolling, and cold rolling at a final cold rolling reduction of 15-95% with or without process annealing, and subjecting a resulting aluminum allow sheet to pretreatment by alkaline etching, and further to sulfuric anodic oxide coating treatment.

13. The process according to claim 12, further comprising final annealing after said cold rolling.

* * * * *